Dec. 24, 1968    J. J. J. STAUNTON    3,418,051
MONOCHROMATOR SYSTEM WITH SELECTIVE DIFFRACTION GRATING SYSTEM
Filed Sept. 8, 1964    3 Sheets-Sheet 1

Inventor:
John J. J. Staunton
By Bair, Freeman & Molinare Attys.

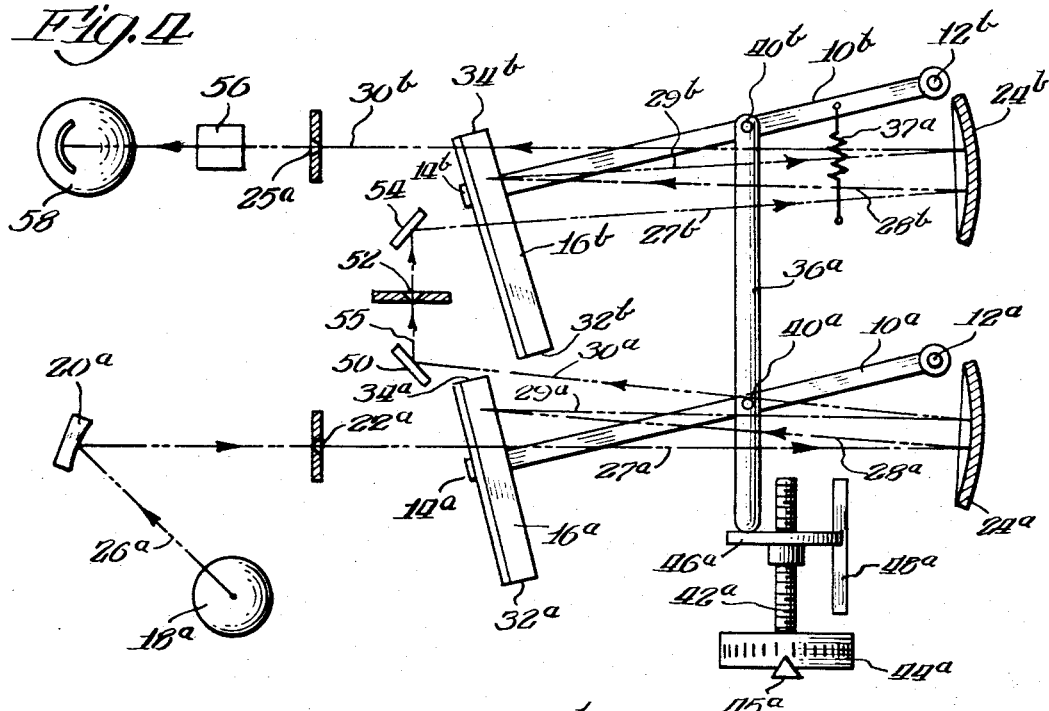
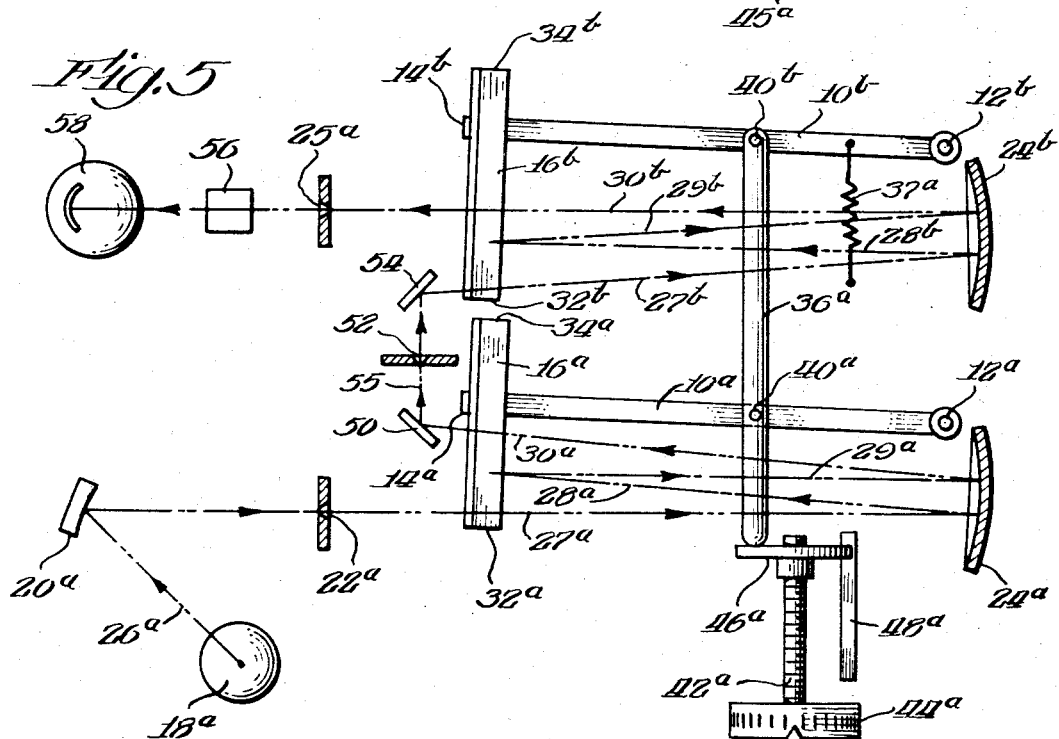

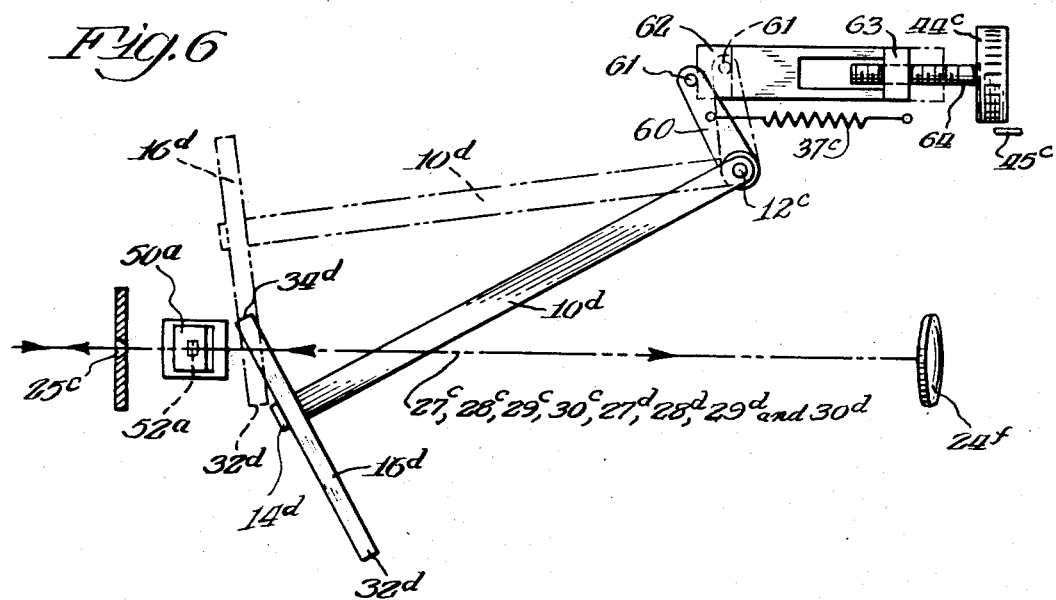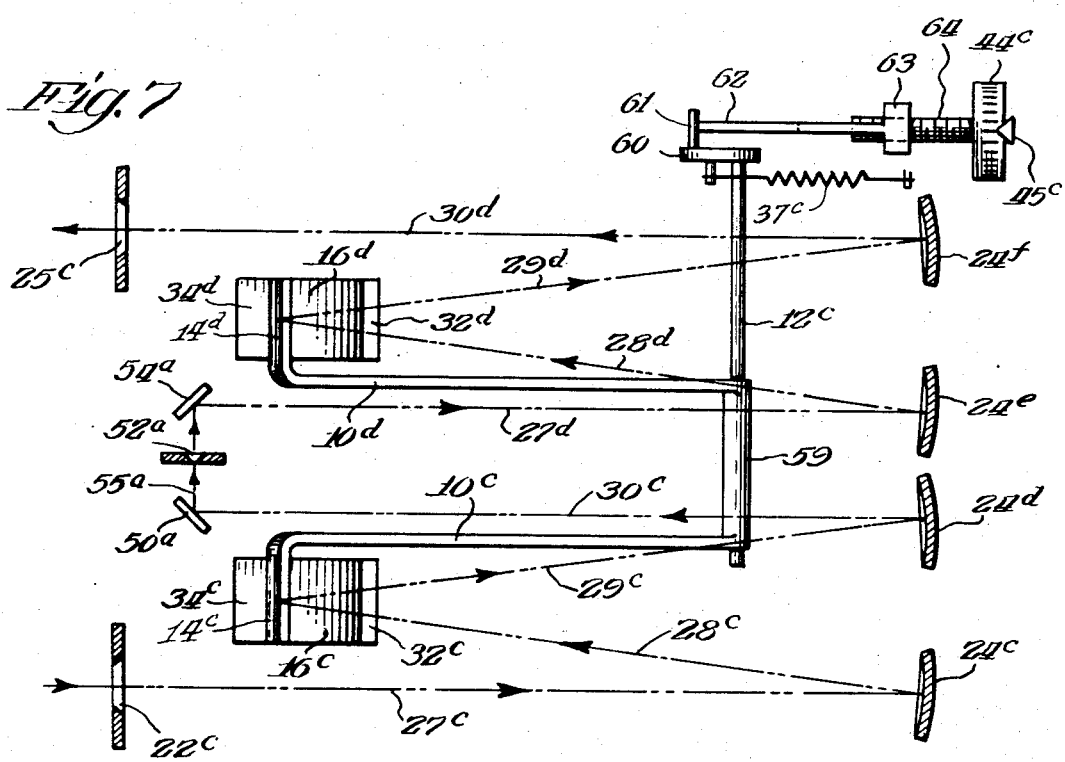

United States Patent Office 3,418,051
Patented Dec. 24, 1968

3,418,051
MONOCHROMATOR SYSTEM WITH SELECTIVE
DIFFRACTION GRATING SYSTEM
John J. J. Staunton, Oak Park, Ill., assignor, by mesne assignments, to The Perkin-Elmer Corporation, Norwalk, Conn., a corporation of New York
Filed Sept. 8, 1964, Ser. No. 394,997
8 Claims. (Cl. 356—101)

ABSTRACT OF THE DISCLOSURE

A monochromator system which utilizes a particular type of light-dispersing medium, namely, a selective diffraction grating (grating plus interference wedge or graduated filter layer) as disclosed in U.S. Patent No. 3,334,-956. The grating swings on an arm to facilitate adjusting the wavelength, which arm is located out of the plane of the light beam portions passing directly from the entrance and exit slits to the collimating mirrors. The system is of simple, compact, low cost construction and provides a light beam within a range of desired wavelengths accompanied by little stray light and no extraneous orders. The invention is particularly adapted for use in a double monochromator using two gratings, at least one of which is a selective diffraction grating.

---

This invention relates to a monochromator system provided with a selective diffraction grating system of the kind shown in my copending application, Ser. No. 288,170, filed June 17, 1963 now Patent No. 3,334,956, the present application being a continuation-in-part of said copending application.

One object of the invention is to provide a bi-level configuration for a monochromator system which has a folded light beam system that minimizes the overall dimensions of the monochromator, yet which provides for substantially unlimited wave length adjustment of the diffraction grating, the configuration being also applicable to a double monochromator system.

Another object is to provide a double monochromator system with either a bi-level configuration or an over-and-under configuration, both of which are conducive to minimization of the space required for housing the system.

Still another object is to provide a novel mounting of the grating on a grating arm such that space is provided for an extended length grating such as a selective diffraction grating of the type shown in my parent application to swing, with not only no increase in optical aberrations but actually a much more aberration-free system.

A further object is to provide a relationship between the plane of certain portions of the light beam and the grating such that those portions pass by a side edge of the grating thereby permitting the grating to be adjusted lengthwise of the intercepted light beam from a collimating mirror over a relatively wide range without interference at any time as between the plane of such portions of the light beam and the diffraction grating itself.

Still a further object is to provide a pivotal mounting for a diffraction grating in the form of an arm extending from the grating toward a collimating mirror and having a pivotal mounting at its end adjacent the collimating mirror but offset to one side of its axis whereby swinging of the arm changes the angle of reflection of the grating with respect to the intercepted light beam and at the same time the position of interception with respect to the length of the grating.

An additional object is to provide a monochromator configuration which is simple and low cost in construction, and which has low stray light and high resolution.

Figure 1:
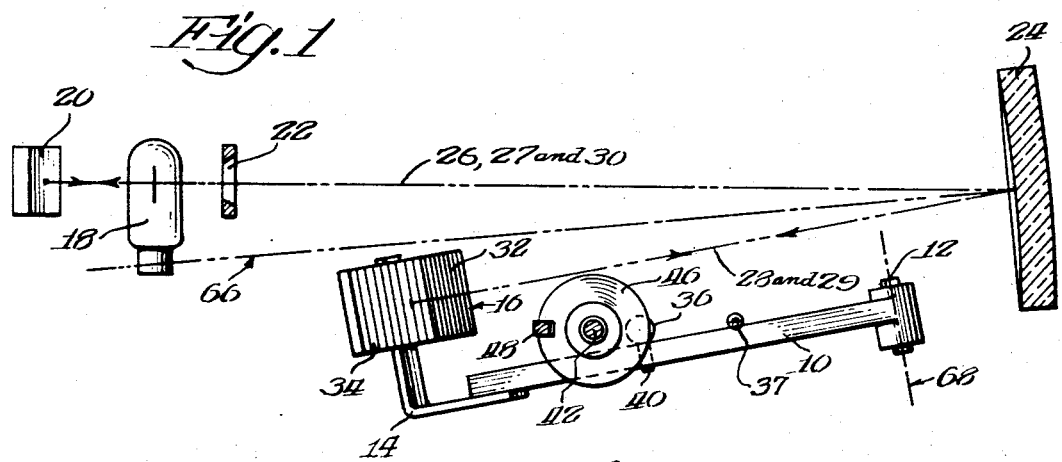
Figure 2:
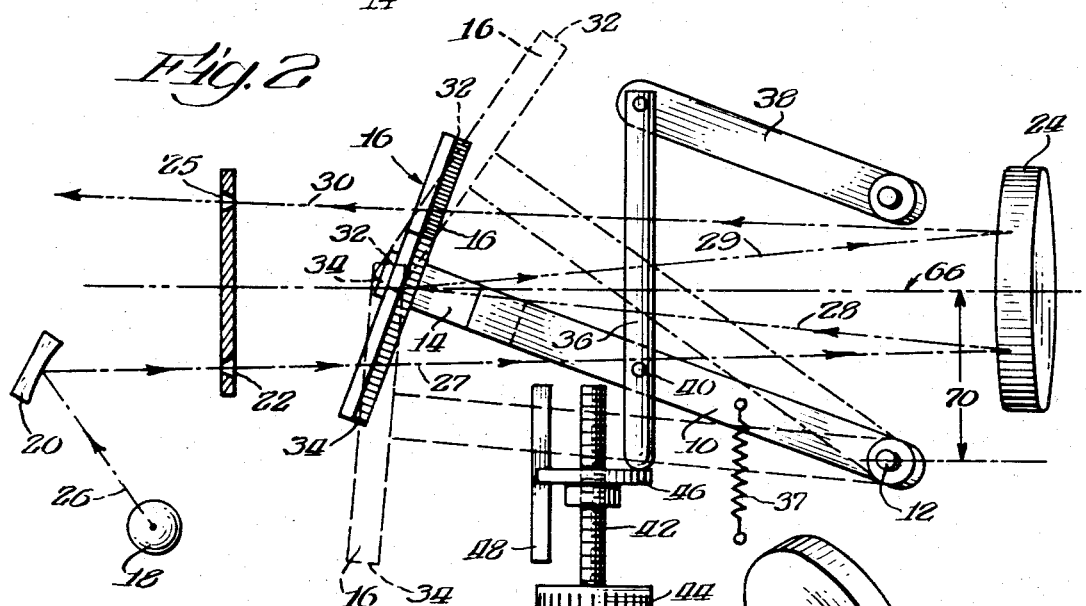
Figure 3:
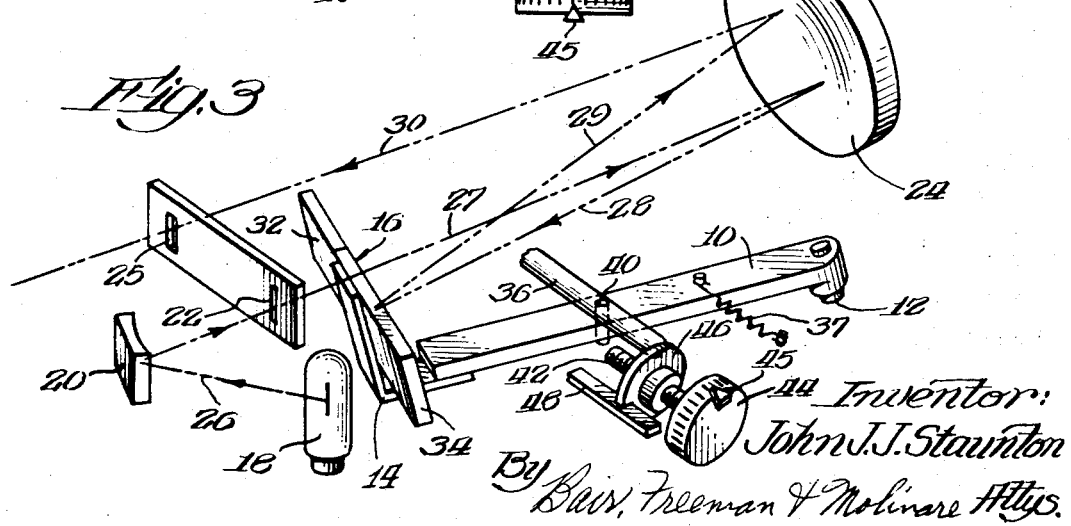

With these and other objects in view, my invention consists in the construction, arrangement and combination of the various parts of my monochromator system, whereby the objects above contemplated are attained, as hereinafter more fully set forth, pointed out in my claims and illustrated in detail on the accompanying drawings, wherein:

FIG. 1 is a side elevation, somewhat diagrammatic of a preferred bi-level configuration for my monochromator system in which my selective diffraction grating system is used;
FIG. 2 is a plan view thereof;
FIG. 3 is a perspective view thereof;
FIGS. 4 and 5 are plan views of a double monochromator system of bi-level configuration and also exemplify a spectrophotometer, FIG. 4 showing the diffraction gratings of the monochromators positioned for a long wave length setting and FIG. 5 for a short wave length setting;
FIG. 6 is a plan view of another arrangement of double monochromator system (over-and-under configuration), and
FIG. 7 is a side elevation thereof.

In FIGS. 1, 2 and 3 I have used the reference numeral 10 to indicate a grating arm which is supported by a grating arm pivot 12. A grating support 14 is carried by the arm 10 and a selective diffraction grating 16 is supported thereby. As used in this specification and in the appended claims, the phrase "selective diffraction grating" shall mean a diffraction grating (dispersing means for the light) in combination with an interference wedge or a graduated reflecting or transmitting filter layer (an order sorter of the dispersed light beam) as fully described in my Patent No. 3,334,956. This grating eliminates all except one order, without reducing substantially the intensity of that order.

A light source is shown at 18, a condensing mirror at 20 and an entrance slit at 22. A collimating mirror 24 is also provided to render the light rays parallel and properly direct them, and an exit slit 25.

A light beam issues from the light source 18 as indicated at 26 and is reflected by the condensing mirror 20 through the entrance slit 22 as indicated at 27 to strike the collimating mirror 24 from which it is reflected at 28 back to the grating 16. The light beam is reflected as at 29 from the grating 16 to the collimating mirror 24 from which it is reflected as at 30 through the exit slit 25 to pass on to a point of use such as a mechanism which converts the monochromator to a spectrophotometer as described hereinafter in connection with FIGS. 4 and 5.

The diffraction grating 16 has a short wave length (ultraviolet) end 32 and a long wave length (infrared) end 34, and may be of the bipartite type illustrated, of the monopartite type or of the masked type as the monochromator system disclosed offers benefits for both types. Generically these various types have longitudinally varying properties.

For the purpose of micrometrically adjusting the angle of the grating arm 10 and thereby the grating 16, a suitable adjusting mechanism may be provided such as a rod 36 constrained to a fixed orientation as for instance by an arm 38 acting with the grating arm 10 as a parallelogram linkage, a pin 40 carried by the rod 36 and coacting with a hole in the grating arm 10, and an adjusting screw 42 for imparting longitudinal movement to the rod 36, this mechanism being recognizable as a sine drive. The screw 42 has an adjusting knob 44 thereon, the screw, of course, being rotatably mounted in any suitable manner and restrained against movement axially. A stationary pointer 45 coacts with indicia on the knob for reading off the wave length. A flange nut 46 is threaded on the screw 42 and held against rotation by a stationary bar 48. A spring 37 biases the rod 36 through the grating arm 10 into engagement with the flange nut 46.

Accordingly, rotation of the knob 44 moves the flange nut 46 along the adjusting screw 42 and thereby swings the arm 10 about its pivot 12 in a manner which will be recognized as generating a sine relationship between the angle of rotation of the arm 10 and that of the knob 44, the motion of the arm 10 being downwardly from its median position in FIG. 2 for coaction of the beam 28–29 with the short wave length end 32 of the grating 16 as shown by dotted lines, or upwardly for coaction thereof with the long wave length end 34 as shown by dot-and-dash lines.

By offsetting the grating support 14 from the grating arm pivot 12 the distance represented by the length of the grating arm 10, and by offsetting the pivot 12 the distance 70 shown in FIG. 2 from the collimating mirror axis 66, the wave length setting mechanism 36–42–44–46 may be adjusted to an angle such that the corresponding selected wave length is reflected back to the collimator mirror which then images the beam on the exit slit 25. The exit slit then passes only the desired wave length interval from the spectrum lying across its face and rejects the rest, thus fulfilling the function of the monochromator.

In FIGS. 4 and 5 I show my monochromator system applied to a double monochromator wherein elements comparable to those illustrated in FIGS. 1, 2 and 3 bear the same reference numerals with the addition of the distinguishing characteristics $a$ and $b$. In a double system the first monochromator projects the light beam 30$^a$ against an intermediate mirror 50 which reflects the beam as at 55 through an intermediate slit 52 to another intermediate mirror 54 which reflects the light beam as at 27$^b$ to the second collimator mirror 24$^b$ of the double monochromator disclosed. The outgoing beam 30$^b$ from the collimator mirror 24$^b$ passes through a slit 25$^a$ and then through a sample cell 56 to a photo tube 58 whereby the double monochromator disclosed is part of a spectrophotometer. The grating arms 10$^a$ and 10$^b$ are simultaneously adjusted and synchronized with respect to each other by means of a rod 36$^a$ pinned at 40$^a$ and 40$^b$ to both of the arms, the rod being adjusted in the same manner as disclosed in FIG. 2.

A double monochromator of the type shown in FIGS. 4 and 5 has the first and second monochromators arranged side-by-side and on the same level as the single monochromator shown in FIG. 1 and is of the same bi-bevel configuration in side elevation as disclosed in FIG. 1. The beam portion 30$^a$ represents fulfillment of the function of a first monochromator, and after passing the intermediate slit 52, the beam is reflected back to the collimator mirror 24$^b$ of the second monochromator by the intermediate mirrors 54 and 55, the collimator mirror 24$^b$ parallelizes the beam, directing it to the exit slit 25$^a$ (beam portions 55–27$^b$–28$^b$–29$^b$). At this time any white stray light or higher spectral orders passing the intermediate slit 52 are spread out into a spectrum on the exit slit 25$^a$ which passes only the desired wave length interval, rejecting the rest, thus fufilling the function of the second monochromator.

FIGS. 6 and 7 disclose a stacked arrangement wherein the second monochromator is above the first one and thus the system is condensed horizontally to the same configuration in plan view as FIG. 2 as distinguished from the system in FIGS. 4 and 5 condensed vertically. Elements common to FIGS. 1, 2 and 3 are designated by the same reference numerals with the addition of the distinguishing characteristics $c$, $d$, $e$ and $f$ whereas the mirrors 50 and 54, the intermediate slit 52 and the light beam 55 of FIGS. 4 and 5 have comparable elements distinguished by $a$. Instead of two collimating mirrors 24$^a$ and 24$^b$ as in FIGS. 4 and 5, four are shown designated 24$^c$, 24$^d$, 24$^e$ and 24$^f$ in FIG. 7. The light beams 27$^c$ through 30$^d$ are all in a single vertical plane as illustrated in FIG. 6.

In the type of device shown in FIGS. 6 and 7, the grating arms 10$^c$ and 10$^d$ may be synchronized and adjusted together by a hub 59 rigidly connecting the arms together and mounted on a shaft which constitutes the pivot 12$^c$. The shaft may have an arm 60 thereon carrying a pin 61 which is urged by a square-ended sliding member 62 which is driven by a screw 64 mating with a nut 63 attached to the sliding member thereby effecting one of the forms which a sine drive may take. The adjusting knob 44$^c$ is mounted on the screw 64. The pivot shaft 12$^c$ and the hub 59, while they apparently cut across the light beams in FIG. 7, do not, in fact, do so because of the off-set of 12$^c$ relative to the vertical plane in which the collimator mirror axes lie and which corresponds to the light beams 27$^c$ through 30$^d$ indicated.

The foregoing description is of monochromator configurations which are a preferred way of using the diffraction grating systems of my parent application. The configuration is a "bi-level" or an "over-and-under" design, the light beams 26, 37 and 30 as shown in FIG. 1 being over the grating 16 and the grating being under these beams. The beams 28 and 29 are on a different level than the beams 26, 27 and 30 and also at a different angle.

In FIGS. 4 and 5 the design referred to is applied to a double monochromator with the two monochromators located side-by-side whereas in FIGS. 6 and 7 the design is applied to a double monochromator in which the two monochromators are vertically stacked. In each case, however, the novel mounting of the grating or gratinsg on the grating arm or grating arms is such that space is provided for an extended grating such as selective diffraction grating of the type shown in my parent application to swing with not only no increase in optical aberrations but actually a much more aberration-free system.

The pivotal mounting 12 of the grating arm 10, offset as it is relative to the axis of the collimator mirror 24 as shown at 70 in FIG. 2 results in the possibility of adjusting the angle of the arm 10 so that the angle of reflection from the beam 28 to the beam 29 in a horizontal plane is less with respect to the face plane of the grating when reflecting from the short wave length end 32 as shown by dotted lines than when adjusted to the dot-and-dash position for the long wave length end 34, all as required for proper operation of a reflective diffraction grating system. Also FIG. 1 illustrates axis 68 for the pivot 12 which is substantially at right angles to the plane of the beam portions 28 and 29 or parallel to the face of the grating to keep the beam vertically centered thereon in all positions to which it is adjusted. It will be noted that the long wave length ends and short wave length ends in FIGS. 4 to 7 inclusive are reversed with respect to FIGS. 1, 2 and 3 and, accordingly, the pivots are on the opposite side of the axes of the collimator mirrors.

In the development of the monochromator system disclosed, the following requisites have been met:

(1) Simplicity and low cost of construction.
(2) Low stray light.
(3) High resolution.

The monochromator system disclosed is a combination of elements which fills the requirements to a degree not attained by prior art systems. Referring to FIGS. 1, 2 and 3, to achieve highest resolution, the monochromatic image formed by the collimator mirror 24 at the plane of the exit slit 25 must be identical in size and shape to the image formed at the entrance slit 22. The cheapest form for the collimating mirror 24 is a spherical mirror but such a mirror only forms perfect images without aberrations or distortion if the image and object are substantially on its principal axis, i.e., the axis through its center perpendicular to the plane of the mirror. Therefore, the slits 22 and 25 are placed near together and as near to the principal axis as possible.

Although the diffraction grating 16 when of the selective type as disclosed in my parent application requires a considerable space in which to swing (comparing the dotted line position of FIG. 2 with the dot-and-dash line position thereof) I still wish to keep the collimating mirror 24 small and the slits 22 and 25 near the axis. Accordingly, I provide the system shown in FIGS. 1, 2 and 3 where the slits are side-by-side and the grating lies centrally below the beams 27 and 30 thus giving ample room for even a long bipartite grating to swing through a large angle without encroaching on the beams from the entrance slit to the collimator mirror or from the collimator mirror to the exit slit. This has the further advantage of causing the astigmatism and coma to lie lengthwise of the slits and therefore become negligible. The close spacing of the slits made possible by this system makes practical much simplified forms of variable slit mechanism. The reduction in size of the collimating mirror 24 made possible by the close spacing of the slits not only lowers the cost of the mirror but has the further advantage of eliminating the unused scattering area of the mirror thus reducing stray light without the necessity of masking off part of the mirror. To make possible the use of the axis 12, thus simplifying the wave length drive, the beams 28 and 29 are sloped downward as shown in FIG. 1 and the diffraction grating is below the beams 27 and 30. Alternatively, of course, the beams 28 and 29 could be level and the beams 27 and 30 sloped upwardly away from the mirror 24. In all instances, the slits are arranged perpendicular to the beams thus producing the novel system lay-out of bi-level type disclosed.

A further consequence of the use of the axis 12 as disclosed is that a novel method of transferring from one section to the other of a bipartite grating can be effected as part of the wave length drive without the inclusion of any additional moving parts. This design further permits orienting the direction of swing of the grating to throw the part of the spectrum most likely to reach the exit slit as scattered light into the direction where it can be most readily trapped; while at the same time this direction of swing provides the most compact assembly.

A further object in mounting the grating below the collimator-slit plane, is that the spread-out spectra returned from the grating, fan out in a plane inclined to the plane defined by the slits and the collimator of the second monochromator as shown in FIGS. 4 and 5 and hence trapping of stray light especially in the ultraviolet where it is most essential can be effected with a minimum of baffles or additional partitions. A further advantage resulting from the use of a bipartite grating is the reduction of bright extraneous orders which could become scattered stray light. It is to be understood that the same grating mounting system can be used for a tripartite or multipartite grating system having a blaze angle varying linearly across its width to give a desired progressive change in wave length of maximum efficiency from one end to the other.

My system thus effects a significant improvement in reduction of stray light which may be further enhanced if one or both of the gratings follows the selective grating teaching in my copending application. In this event, as is there shown, overlapping orders inherent with ordinary gratings may be entirely suppressed. Thus, for the first time, two grating monochromators may be combined as a double monochromator without the presence of extraneous orders in the beam leaving the exit slit. With conventional gratings this is not possible as the second grating cannot eliminate the higher orders of the first.

The desirability of this improved double grating, double monochromator inures as a direct consequence of being able to use equal-width slits to give identical bandpasses in both monochromators. In all grating monochromators stray light consisting of a certain amount of scattering of adjacent wavelengths into the selected pass band may be found. This near scatter, as it is called to distinguish it from general stray light, can only be completely rejected if both the monochromators have the same dispersion and band pass. The second monochromator will then fully remove by redispersion all the near scatter in the pass band from the first monochromator and will completely reject all near scatter lying outside the pass band. In contrast, double monochromators using a prism or other means in one monochromator for the purpose of eliminating extraneous orders of the grating and for stray light reduction cannot effectively eliminate near scatter except for limited wave length regions because the generally wider band pass of the prism section does not reject the wave lengths of near scatter lying in the region between this wider band pass and the narrower band pass of the grating section. As near scatter is a serious and prevalent source of stray light the utility of the double grating monochromator of my novel design will be apparent.

A selective type diffraction grating is preferable in each monochromator of the double monochromator. If only one of the two gratings is a selective diffraction grating the best position for this is as the second grating. With this arrangement less stray light will leave the second monochromator because the second grating will do a better job of rejecting residual stray light in the higher orders. However, an additional advantage of the selective diffraction grating when two of them are used in a double monochromator combination, is that they may be made different in characteristics so that the second one supplements the first, leveling out the spectral distribution curve produced by the grating used in the first monochromator.

Certain elements of my monochromator configuration bear significant relationships to each other as will be obvious in FIG. 1 when considering that the collimating mirror 24 reflects a light beam in a first given plane therefrom and back to the mirror as at 28 and 29 after the beam impinges the grating. The entrance slit 22 is so located relative to the collimating mirror as to admit an entrance portion of the light beam and the collimating mirror is so located relative to the exit slit as to reflect an exit portion of the light beam therethrough, these two portions being in a second given plane (27 and 30) which intersects the first given plane. The grating 16 is located with its length intersecting this first given plane and its side edge (top edge in FIG. 1) spaced from the second given plane so that the grating can be adjusted in the first given plane (lengthwise movement of the grating as shown by the dotted, and dot and dash lines of FIG. 2) for wave length adjustment without interference with the beams 27 and 30. The configuration illustrated in FIGS. 4 and 5 are comparable to those illustrated in FIGS. 1 and 2.

The configuration shown in FIGS. 6 and 7 is such that the light beam portions $27^c$ and $30^d$ are beyond the outside side edges of the gratings $16^c$ and $16^d$ (below $16^c$ and above $16^d$, respectively) while the beam portions $30^c$ and $27^d$ are between the inside edges of $16^c$ and $16^d$ (above $16^c$ and below $16^d$, respectively). There are, of course, a number of other possible ways of linking two monochromators together to form a double monochromator. Whether I use a monochromator of the type where the slits are side-by-side or one of the type where the slots are disposed above and below the grating it would be impractical to show all the possible permutations.

Some changes may be made in the construction, and arrangement of the parts of my monochromator system and in the configurations disclosed without departing from the real spirit and purpose of my invention, and it is my intention to cover by my claims any modified forms of structure or use of mechanical equivalents which may reasonably be included within their scope.

I claim as my invention:

1. A monochromator system comprising entrance and exit slits, collimating mirror means opposite said slits, an elongated selective diffraction grating so disposed with respect to said collimating mirror means as to receive from and reflect back to said mirror means light beam portions passing through said system, said beam portions lying in a first given plane, said entrance slit being so located relative to said collimating mirror means as to admit an entrance portion of said light beam and said collimating mirror means being so located relative to said exit slit as to reflect an exit portion of said light beam through said exit slit, said entrance and exit portions lying in a second given plane intersecting said first given plane at the surface of said collimating mirror, said grating being offset from said second plane with its longitudinal axis lying in said first plane and its face being perpendicular to said first plane, to thereby permit unlimited lengthwise movement of said grating for wavelength adjustment without interference with said entrance and exit portions of said light beam.

2. The monochromator system according to claim 1 wherein wavelength adjusting means is provided for said grating in the form of an arm extending from the grating and terminating in a pivot offset to one side of the axis of said collimating mirror means.

3. A monochromator system according to claim 2 wherein said pivot has an axis substantially parallel to the face of the grating.

4. A double monochromator system comprising a first monochromator having entrance and exit slits, collimating mirror means opposite said slits, a selective diffractive grating so disposed with respect to said collimating mirror means as to receive from and reflect back to said mirror means light beam portions passing through said system, said beam portions lying in a first given plane, said entrance slit being so located relative to said collimating mirror means as to admit an entrance portion of said light beam and said collimating mirror means being so located relative to said exit slit as to reflect an exit portion of said light beam through said exit slit, said entrance and exit portions lying in a second given plane intersecting said first given plane at the surface of said collimating mirror, and said grating being offset from said second plane with its longitudinal axis lying in said first plane and its face being perpendicular to said first plane, to thereby permit unlimited lengthwise movement of said grating for wavelength adjustment without interference with said entrance and exit portions of said light beams, and a second monochromator located in side by side relation to the first monochromator with said entrance and exit slits serving both, intermediate mirror means and intermediate slit means being provided for the exit portion of said light beam from said first monochromator and for the entrance portion of said light beam to said second monochromator.

5. A double monochromator system comprising two elongated diffraction gratings, one of which is a selective diffraction grating, an entrance slit, an exit slit, and an intermediate slit, a collimating mirror for each grating, said gratings being so located with respect to said collimating mirrors as to reflect light beams therefrom back thereto, said mentioned light beams lying in first given planes, said entrance slit being so located relative to the first collimating mirror as to admit an entrance portion of said light beam and said first collimating mirror being so located relative to said intermediate slit means as to reflect an intermediate portion of said light beam thereto, said intermediate slit means being so located relative to the second collimating mirror as to admit another intermediate portion of said light beam thereto and said second collimating mirror being so located relative to said exit slit as to reflect an exit portion of said light beam therethrough, said entrance and exit portions lying in second given planes intersecting said first given planes at the surfaces of said collimating mirrors and said gratings being offset from said second planes with their longitudinal axes lying in said first given planes and the faces of said gratings being perpendicular to said first planes to thereby permit unlimited lengthwise movement of said gratings for wavelength adjustment without interference with said entrance or exit portions of said light beams.

6. The double monochromator system of claim 5 wherein said collimating mirror-grating pairs are mounted side by side.

7. The double monochromator system of claim 5 wherein said collimating mirror-grating pairs are mounted one above the other.

8. The double monochromator of claim 7 in which said two diffraction gratings are mounted on arms connected to a common rotating shaft for movement in a horizontal plane.

References Cited

UNITED STATES PATENTS

| 2,874,608 | 2/1959  | Beloian      | 88—14 |
| 3,306,158 | 2/1967  | Makabe et al.| 88—14 |
| 3,216,315 | 11/1965 | Keller       | 88—14 |

OTHER REFERENCES

Steel, W. H., Revue d'Optique, vol. 31, No. 6, p. 309, June 1952.

JEWELL H. PEDERSEN, *Primary Examiner.*

B. J. LACOMIS, *Assistant Examiner.*